United States Patent
Mori et al.

(10) Patent No.: US 7,364,336 B2
(45) Date of Patent: Apr. 29, 2008

(54) PLANE LIGHT SOURCE DEVICE AND DISPLAY DEVICE PROVIDED WITH THE SAME

(75) Inventors: Akihiro Mori, Kumamoto (JP); Seiji Sakai, Tokyo (JP); Toshiyuki Yoneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/903,296

(22) Filed: Jul. 30, 2004

(65) Prior Publication Data

US 2005/0024845 A1 Feb. 3, 2005

(30) Foreign Application Priority Data

Jul. 30, 2003 (JP) ............................. 2003-282742

(51) Int. Cl.
*F21V 8/00* (2006.01)

(52) U.S. Cl. .................. 362/560; 362/561; 362/27; 362/612; 362/613; 362/614; 362/625; 362/632

(58) Field of Classification Search ............... 362/560, 362/26, 27, 30, 609, 612, 613, 614, 625, 362/632, 555, 558, 561, 260, 330, 511; 349/65, 349/64, 67
See application file for complete search history.

(56) References Cited

U.S. PATENT DOCUMENTS

| | | | | |
|---|---|---|---|---|
| 2,831,453 | A | * | 4/1958 | Hardesty .................... 116/288 |
| 4,989,933 | A | * | 2/1991 | Duguay et al. ................ 385/31 |
| 5,178,447 | A | * | 1/1993 | Murase et al. ............... 362/621 |
| 5,224,770 | A | * | 7/1993 | Simmons et al. .............. 362/29 |
| 5,384,658 | A | * | 1/1995 | Ohtake et al. ............... 359/707 |
| 5,386,347 | A | * | 1/1995 | Matsumoto .................. 362/623 |
| 6,893,135 | B2 | * | 5/2005 | Wright et al. ................ 362/632 |

FOREIGN PATENT DOCUMENTS

| | | | |
|---|---|---|---|
| JP | 09-231822 A | * | 9/1997 |
| JP | 11-038232 | | 2/1999 |
| JP | 2002-258764 | | 9/2002 |

OTHER PUBLICATIONS

Patent Abstracts of Japan, Publication No. 11-038232, Flat Light-Emitting Panel, published Feb. 12, 1999.
Patent Abstracts of Japan, Publication No. 2002-258764, "Back Light and Display Device", O. Kozo.

* cited by examiner

*Primary Examiner*—Sharon E. Payne (57) ABSTRACT

The present invention aims to provide a plane light source device having enhanced efficiency of use of light and high brightness uniformity.

A plane light source device of the present invention is provided with a housing having an opening section, a scattering plate arranged at the opening section for scattering incoming light and a light source arranged at one side face in the housing, wherein a regular reflection section for regularly reflecting light incoming from the light source is provided in the vicinity of the light source at the bottom surface of the housing that is opposite to the scattering plate and a scatter reflection section for irregularly reflecting light incoming from the light source is provided so as to be adjacent to the regular reflection section.

17 Claims, 13 Drawing Sheets

PLANE LIGHT SOURCE DEVICE AND DISPLAY DEVICE PROVIDED WITH THE SAME

BACKGROUND OF THE INVENTION

The present invention relates to a plane light source device and a display device provided with the same, more particularly to a plane light source device used for a backlight of a display device such as a transmissive-type liquid crystal or the like, and to a display device using this plane light source device.

Japanese Unexamined Patent Publication No. 258764/2002 discloses one example of a conventional plane light source device. As shown in FIG. 1 of the above-mentioned publication, this plane light source device reflects light emitted from a light-emitting diode 2 toward light distribution means 1 having a light scattering function with reflection means 3 that is arranged to be inclined, and the reflected light is scattered at the light distribution means 1, thereby forming surface-like illumination light.

The plane light source device disclosed in Japanese Unexamined Patent Publication No. 258764/2002 uniformly reflects light from the light-emitting diode 2, arranged at the edge section, toward the light distribution means 1 by the reflection means 3, so that the illumination light has high brightness in the vicinity of the light-emitting diode 2 but has reduced brightness as it is away from the light-emitting diode 2, thus being non-uniform. When the illumination light of the plane light source device is non-uniform as described above, the displayed image has non-uniform brightness or non-uniform chromaticity, thereby entailing a problem of deteriorating an image quality.

SUMMARY OF THE INVENTION

The object of the present invention is to solve the above-mentioned problem, and to provide a plane light source device having high efficiency of use of light and enhanced brightness uniformity. Further, the object of the present invention aims to provide a plane light source device capable of obtaining desired brightness distribution depending upon a characteristic of a display device.

A plane light source device of the present invention includes a housing having an opening section, a scattering plate arranged at said opening section for scattering incoming light, and a light source arranged in said housing, said plane light source device further including: a regular reflection section which regularly reflects incoming light from said light source and a scatter reflection section which irregularly reflects said incoming light, wherein both said regular reflection section and scatter reflection section are provided at said bottom surface of said housing opposite to said scattering plate, wherein a refracting device for refracting light emitted from said light source toward said regular reflection section and said scatter reflection section is provided at the position where light from said light source is emitted.

DETAILED DESCRIPTION

Embodiments of plane light source device according to the present invention will be explained with reference to the drawings. In each figure, members given the same numerals substantially represent the same components.

Embodiment 1

Figure 1:
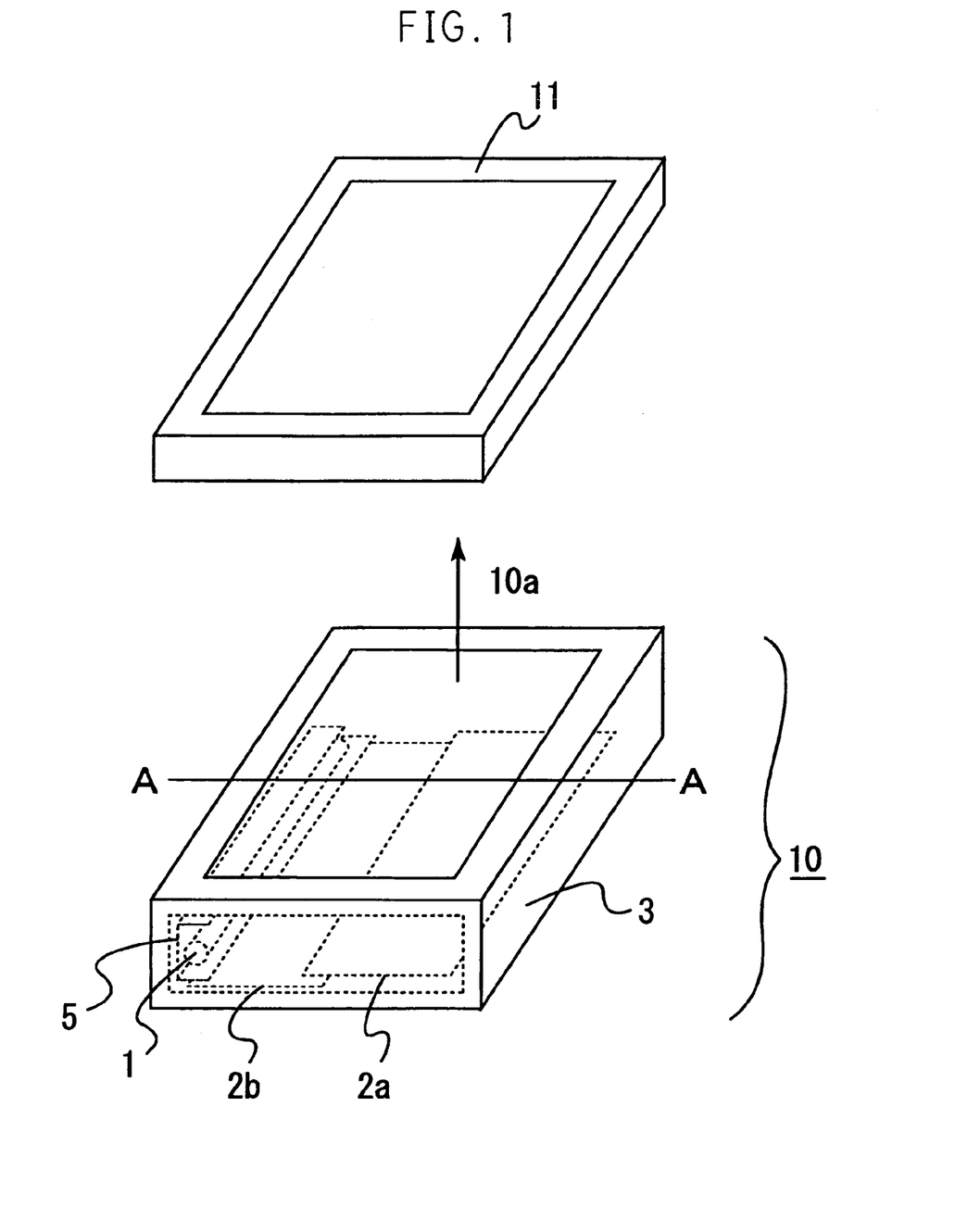
FIG. 1 is an exploded perspective view showing one embodiment of a plane light source device according to the present invention.
Figure 2:
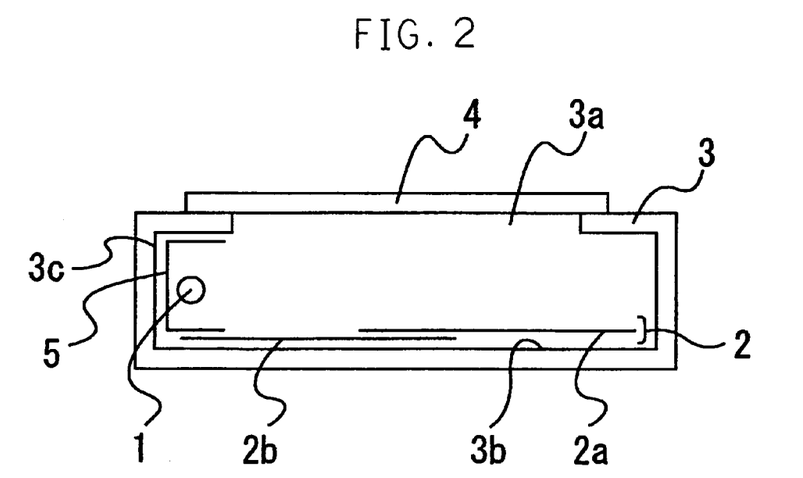
FIG. 2 is a sectional view showing one embodiment of the plane light source device according to the present invention.

FIG. 1 is a perspective view showing a schematic construction of a display device, according to one embodiment, provided with a plane light source device 10 of the present invention, and FIG. 2 is a partial sectional view taken along a line A-A of the plane light source device shown in FIG. 1. In FIGS. 1 and 2, numeral 3 denotes a housing having an opening section 3a. A scattering plate 4 that scatters incoming light is arranged at the opening section 3a of the housing 3. Numeral 1 denotes a line light source that is arranged at one side face 3c at the inside of the housing 3. Numeral 2 denotes a reflection plate that reflects incoming light from the line light source 1 toward the scattering plate 4. The reflection plate 2 is composed of a scatter reflection plate 2a that irregularly reflects the incoming light and a regular reflection plate 2b that regularly reflects the incoming light, and is arranged at the bottom surface 3b opposite to the opening section 3a of the housing 3. Further, the regular reflection plate 2b is arranged in the vicinity of the line light source 1, while the scatter reflection plate 2a is arranged at a position apart from the line light source 1. Numeral 5 denotes a reflector disposed in the vicinity of the line light source 1 for reflecting light, including light emitted from the line light source 1, that directs toward the inner wall of the housing 3 toward the reflection plate 2 or the scattering plate 4.

As shown in FIG. 1, a liquid crystal display panel 11 or the like as a display device is arranged at the light-emitting surface of the plane light source device 10 having the aforesaid construction. Light from the plane light source device 10 reaching the liquid crystal panel 11 is modulated with an image signal to thereby display each color of R, G and B.

As shown in FIGS. 1 and 2, the scatter reflection plate 2a is arranged at the position apart from the line light source 1, while the regular reflection plate 2b is arranged in the vicinity of the line light source 1. The scatter reflection plate 2a irregularly reflects light incoming from the line light source 1, while the regular reflection plate 2b regularly reflects the incoming light from the line light source 1, i.e., reflects the incoming light at an emitting angle equal to the incident angle. Further, an overlapping section is formed at the area where the scatter reflection plate 2a and the regular reflection plate 2b are adjacent to each other, so as not form a space between them.

Figure 4:
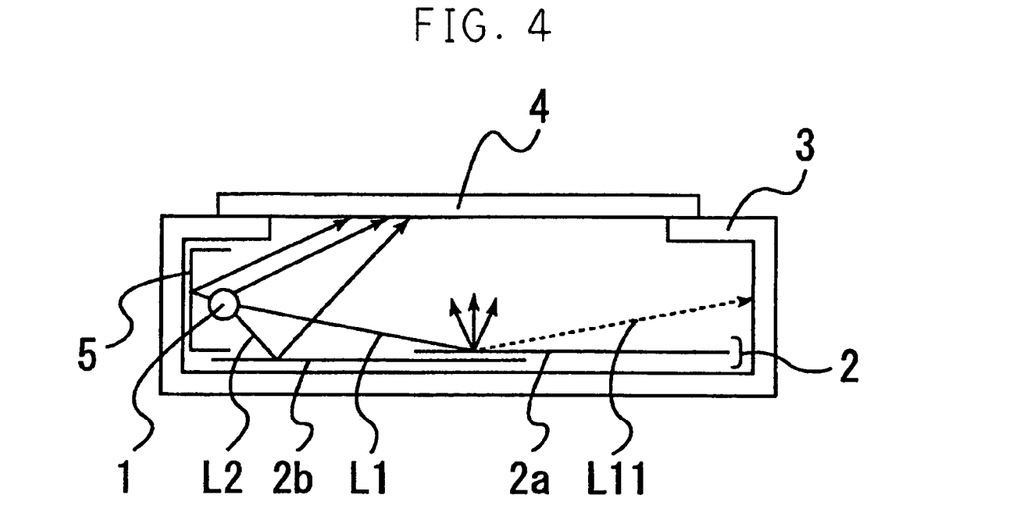
FIG. 4 is a sectional view showing one embodiment of the plane light source device according to the present invention.

FIG. 4 is a view of an optical path for explaining an action of each of the scatter reflection plate 2a and the regular reflection plate 2b shown in FIGS. 1 and 2.

Light emitted from the line light source 1 is directly incoming or reflected by the reflector 5 to be incoming on the scattering plate 4, scatter reflection plate 2a or regular reflection plate 2b. The light L2 incoming on the regular reflection plate 2b arranged in the vicinity of the line light source 1 is reflected at an angle equal to the incident angle to be impinged on the scattering plate 4. On the other hand, the light L1 incoming on the scatter reflection plate 2a is irregularly reflected in the vicinity of the incoming position to thereby irradiate the scattering plate 4. As shown in FIG. 4, the incident angle of the light incoming on the reflection plate 2 becomes approximately parallel as it is apart from the line light source 1. In case where only the regular reflection means is used as the reflection plate 2, the light whose incident angle is approximately parallel is reflected toward the inner wall of the housing 3, not toward the scattering plate 4, as shown by L11 in FIG. 4, so that the brightness of the illumination light is reduced as it is apart from the line light source 1. In the present invention, the scatter reflection plate 2a is arranged at the position apart from the line light source 1, whereby the light reflected toward the inner wall of the housing 3 can be irradiated to the scattering plate 4. This can enhance the efficiency of the use of light, thereby being capable of obtaining uniform illumination light at the scattering plate 4.

As described above, the plane light source device according to the present invention has the regular reflection plate 2b in the vicinity of the line light source 1 and the scatter reflection plate 2a at the position apart from the line light source 1. Therefore, light incoming with an approximately parallel angle at the position apart from the line light source 1 is reflected by the scatter reflection plate 2a toward the scattering plate 4 in the vicinity of the incoming position, thereby being capable of obtaining uniform illumination light.

Setting the reflectivity of the scatter reflection plate 2a, regular reflection plate 2b and reflector 5 to be not less than 90% (preferably not less than 95%) enables the reflection loss at the reflection surface to be restrained. The regular reflection plate 2b is made of a metal plate such as an aluminum or silver or made by vapor-depositing an aluminum or silver on a resinous sheet. The scatter reflection plate 2a is made by roughening the surface of the regular reflection plate, providing on the surface of the regular reflection plate a scattering sheet having a function of transmitting and scattering light or made of a white resinous sheet or made of a metal sheet such as an aluminum or resinous sheet having a white resinous sheet attached thereon or having a white coating applied thereon.

Usable members for the scattering plate 4 include a resinous plate such as polyethylene terephthalate (PET), acrylic resin (PMMA) or polycarbonate (PC) or an optical member such as a glass substrate.

A kind of optical sheet not shown may be provided between the scattering plate 4 and the liquid crystal display panel 11. Usable kinds of optical sheet include a scattering sheet, prism sheet or polarizing reflection sheet, that can control the light distribution characteristic of the emitted light. Further, using the optical sheet such as the prism sheet having a continuous triangle pole with a vertical angle of approximately 90 degrees formed at the side of the display side or the polarizing reflection sheet having a function of reflecting a part of light toward the side of the scattering plate 4 can further reduce non-uniform brightness by the light scattering effect by the scattering plate 4 or re-reflection by the reflection plate 2, and is thus preferable.

Moreover, coating the inside of the housing 3 with a reflection material or white paint can reduce loss of light emitted from the line light source 1.

The reflector 5 is made of a metal plate having a reflection layer made of a silver or aluminum or made of a white resinous sheet.

Figure 3:
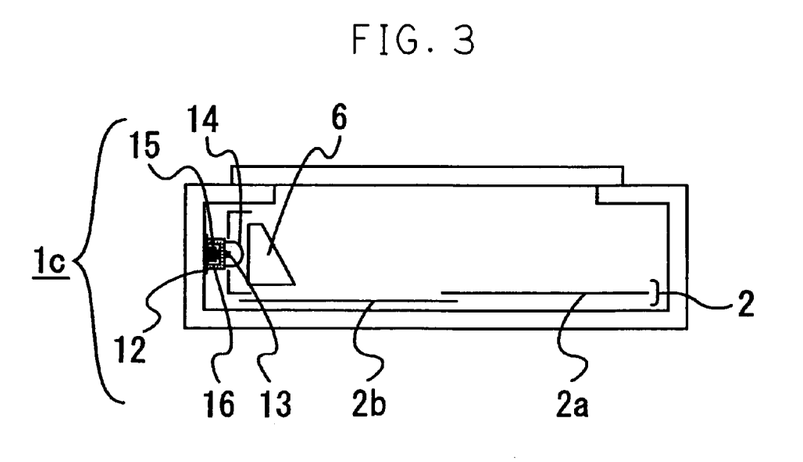
FIG. 3 is a sectional view showing one embodiment of the plane light source device according to the present invention.

Although the above-mentioned plane light source device uses the line light source 1 as a light source, a plurality of point light sources 1c such as LED (Light Emitting Diode) or the like are arranged to form a light source section as shown in FIG. 3. The point light source 1c is composed of an LED chip 13, a heat transferring plate 15 that transmits heat generated from the LED chip 13, a lens 14 that protects the LED chip 13 and adjusts the light distribution characteristic of the LED chip 13, an electrode 16 and a substrate 12 as shown in FIG. 3.

Arranged at the position where light from the point light source 1c is emitted is a refracting device 6 having a trapezoid sectional shape. The refracting device 6 refracts light from the light source toward the reflection plate 2. Combining the point light source 1c having light directivity and the refracting device 6 enables to make light efficiently reach the reflection plate 2, thereby enhancing controllability of the brightness distribution achieved by using the scatter reflection plate 2a and the regular reflection plate 2b for the reflection plate 2.

The point light source 1c may use a single-colored LED such as R, G, B or the like in addition to a white LED. The advantage of using the RGB-LED, compared to the white LED, is that higher luminous efficiency (=light flux amount/applied power) can be obtained by a white color made by mixing RGB. Further, a display having high color reproducibility can be realized by making the emission spectrum of RGB approximately equal to the transmission characteristic of a color filter RGB (not shown) of the liquid crystal panel.

Although the reflection plate 2 is composed of the regular reflection plate 2b and the scatter reflection plate 2a, it should be noted that the reflection plate 2 may be composed of a single plate-like optical member having a regular reflection section that regularly reflects incoming light and a scatter reflection section that irregularly reflects incoming light, this single plate-like optical member being arranged on the bottom surface 3b of the housing 3. Moreover, the regular reflection plate may be arranged all over the bottom surface 3b of the housing 3 and a scattering sheet may be provided on a part of the surface of the regular reflection plate, to thereby form the regular reflection section and the scatter reflection section. This construction decreases the number of components, thereby being capable of reducing a problem such as positional displacement of the reflection plate.

Embodiment 2

Figure 5:
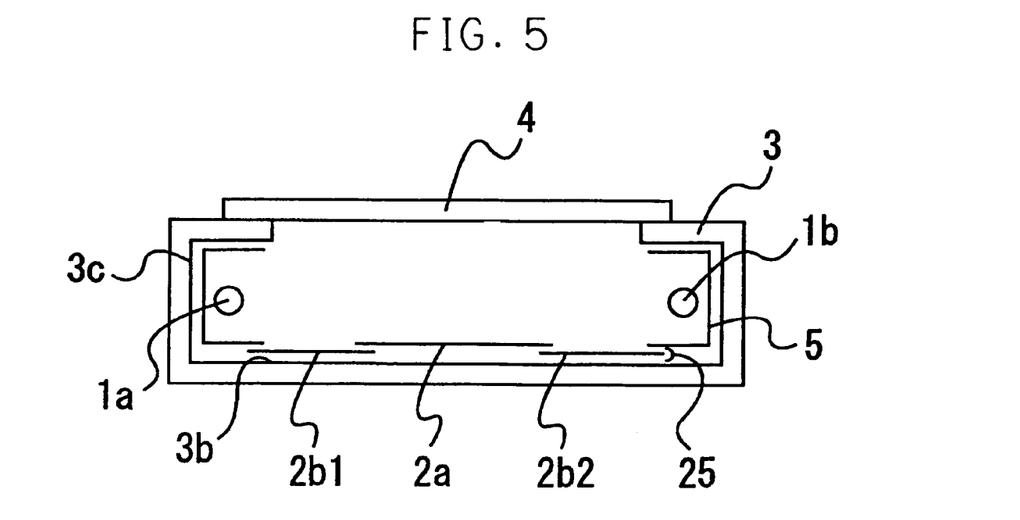
FIG. 5 is a sectional view showing one embodiment of the plane light source device according to the present invention.

FIG. 5 is a view showing another embodiment of the plane light source device according to the present invention. Although the line light source 1 such as CCFL (Cold Cathode Fluorescent Lamp) or the like or a plurality of point light sources 1c are arranged at one side in the housing 3 in the embodiment 1, two line light sources 1a and 1b may be arranged at both sides in the housing 3 so as to oppose to each other as shown in FIG. 5. In this case, a reflection plate 25 is composed of regular reflection plates 2b1 and 2b2 and a scatter reflection plate 2a, wherein the regular reflection plates 2b1 and 2b2 are arranged respectively in the vicinity of the line light sources 1a and 1b, while the scatter reflection plate 2a is arranged at the central portion that is apart from two line light sources 1a and 1b. The other constructions are the same as those in the embodiment 1.

Figure 6:
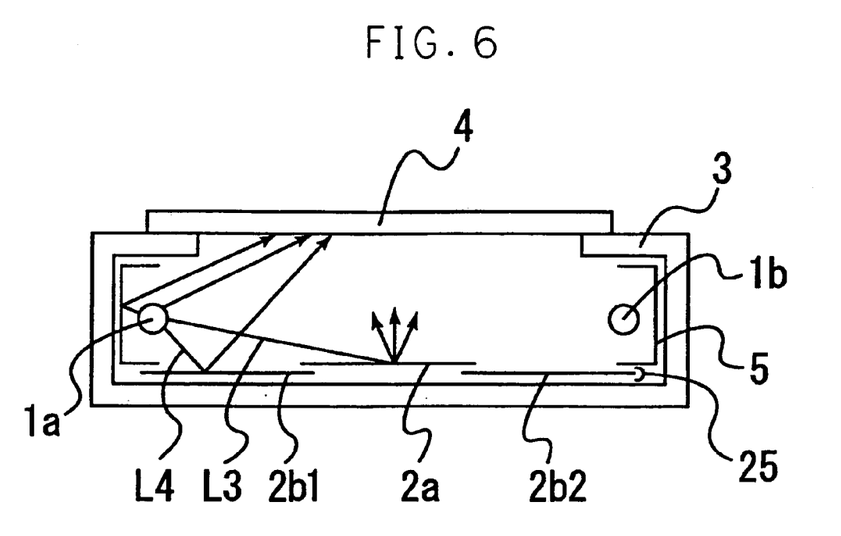
FIG. 6 is a sectional view showing one embodiment of the plane light source device according to the present invention.

FIG. 6 is a view of an optical path for explaining an action of the regular reflection plates 2b1 and 2b2 and the scatter reflection plate 2a shown in FIG. 5.

Light emitted from the line light sources 1a and 1b is directly incoming or reflected by the reflector 5 to be incoming on the scattering plate 4, scatter reflection plate 2a or regular reflection plates 2b1 or 2b2. The light L4 incoming on the regular reflection plates 2b1 arranged in the vicinity of the line light source 1a is reflected at an angle equal to the incident angle to be impinged on the scattering plate 4. On the other hand, the light L3 incoming on the scatter reflection plate 2a is irregularly reflected in the vicinity of the incoming position to thereby irradiate the scattering plate 4. As explained in the embodiment 1, the incident angle of the light impinged on the reflection plate 25 becomes approximately parallel at the position more apart from the line light sources 1a and 1b. In the embodiment 2, the scatter reflection plate 2a is arranged at the central portion that is apart from the line light sources 1a and 1b for irregularly reflecting light incoming from a pair of line light sources 1 toward the central portion of the scattering plate 4, thereby being capable of increasing brightness of the illumination light at the central portion.

As described above, the plane light source device according to the embodiment 2 has regular reflection plates 2b1 and 2b2 arranged in the vicinity of two line light sources 1a and 1b that are arranged at both sides in the housing 3 so as to oppose to each other and the scatter reflection plate 2a arranged at the central portion that is apart from the line light sources 1a and 1b, thereby being capable of obtaining illumination light having an ideal brightness distribution in which a brightness at the central portion is high.

Figure 7:
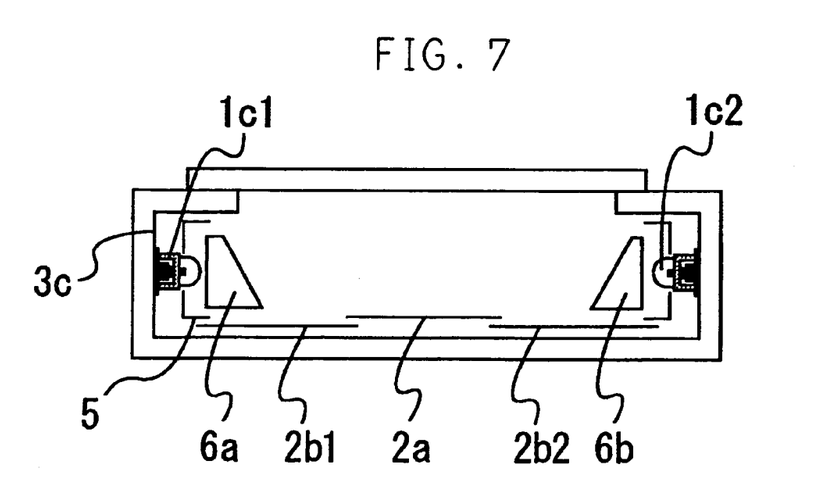
FIG. 7 is a sectional view showing one embodiment of the plane light source device according to the present invention.

Although the explanation is made by using the line light source as a light source, a point light source may be used instead of the line light source. Further, the same effect can be obtained by the construction wherein point light sources 1c1 and 1c2 are used for a light source and refracting devices 6a and 6b are arranged, as shown in FIG. 7.

Figure 9:
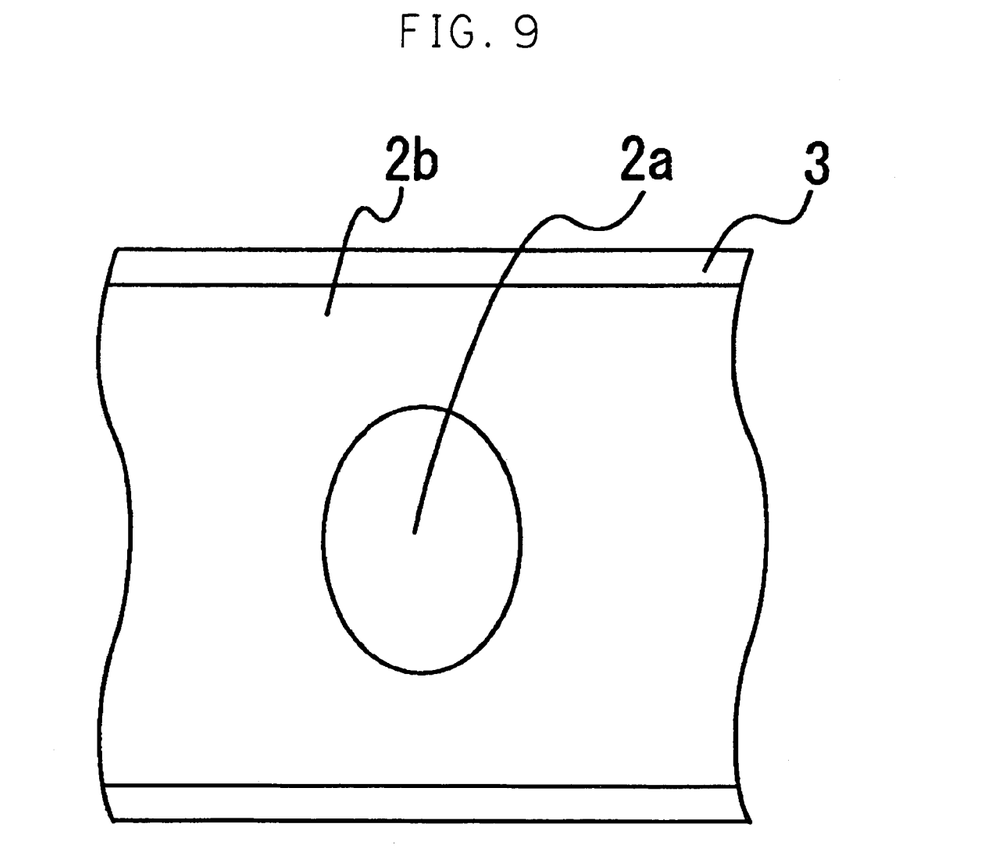
FIG. 9 is a sectional view showing one embodiment of the plane light source device according to the present invention.

As shown in a partial plan view of FIG. 9, an elliptic scatter reflection plate 2a may be arranged at the central portion as a modified example of the embodiment 2. This modified example enables to selectively enhance the brightness of the illumination light at the central portion.

Figure 8:
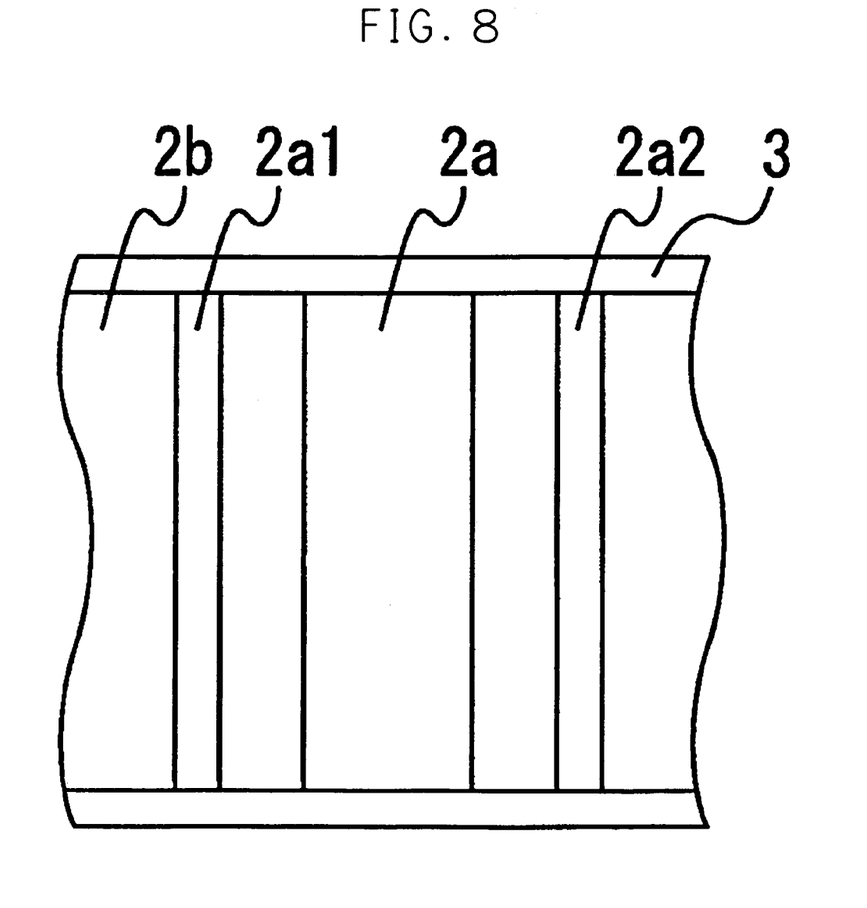
FIG. 8 is a sectional view showing one embodiment of the plane light source device according to the present invention.

Further, as shown in a partial plan view of FIG. 8, the scatter reflection plates 2a1 and 2a2 may be arranged at a portion, other than the central portion, where the brightness is intended to be increased. The shape of the scatter reflection plate is freely set so as to be suitable for the type of the light source to be used or desired brightness distribution as described above, resulting in obtaining a desired brightness distribution in the illumination light. Such adjusting method is effective as a means for adjusting the brightness after the mounting. The scatter reflection plate arranged at the position other than the central portion may have a reflection property different from that at the central portion.

Although the reflection plate 25 is composed of the regular reflection plates 2b1 and 2b2 and the scatter reflection plate 2a, it should be noted that the reflection plate 25 may be composed of a single plate-like optical member having a regular reflection section that regularly reflects incoming light and a scatter reflection section that irregularly reflects incoming light, this single plate-like optical member being arranged on the bottom surface 3b of the housing 3. Moreover, the regular reflection plate may be arranged all over the bottom surface 3b of the housing 3 and a scattering sheet may be provided on a part of the surface of the regular reflection plate, to thereby form the regular reflection section and the scatter reflection section. This construction decreases the number of components, thereby being capable of reducing a problem such as positional displacement of the reflection plate.

Embodiment 3

Figure 10:
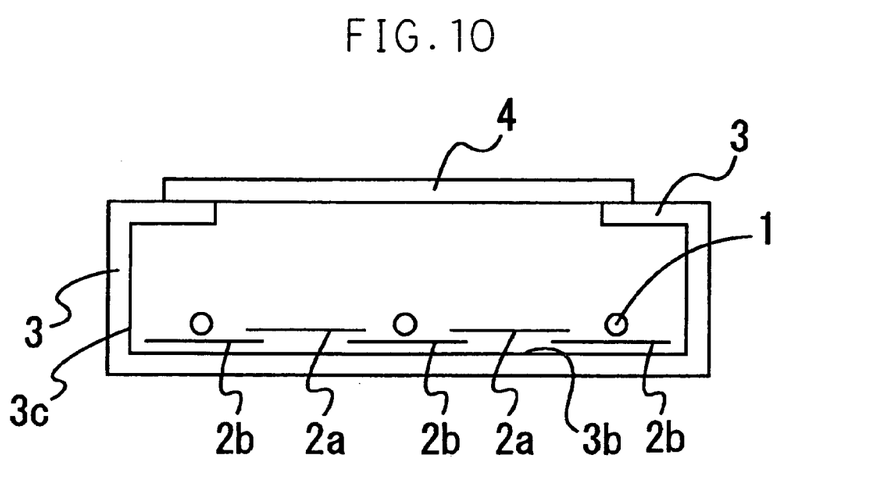
FIG. 10 is a sectional view showing one embodiment of the plane light source device according to the present invention.

FIG. 10 is a view showing another embodiment of the plane light source device according to the present invention. Although the light source is arranged at the side face in the housing 3 in the embodiments 1 and 2, a plurality of line light sources 1 may be arranged at the bottom surface 3b of the housing 3 as shown in FIG. 10. In the plane light source device in the embodiment 3, a plurality of scatter reflection plates 2a and regular reflection plates 2b are alternately arranged so as to be adjacent to each other. Further, the line light sources 1 are arranged on the regular reflection plates 2b at a predetermined space. The other constructions are the same as those in the embodiment 1.

Figure 11:
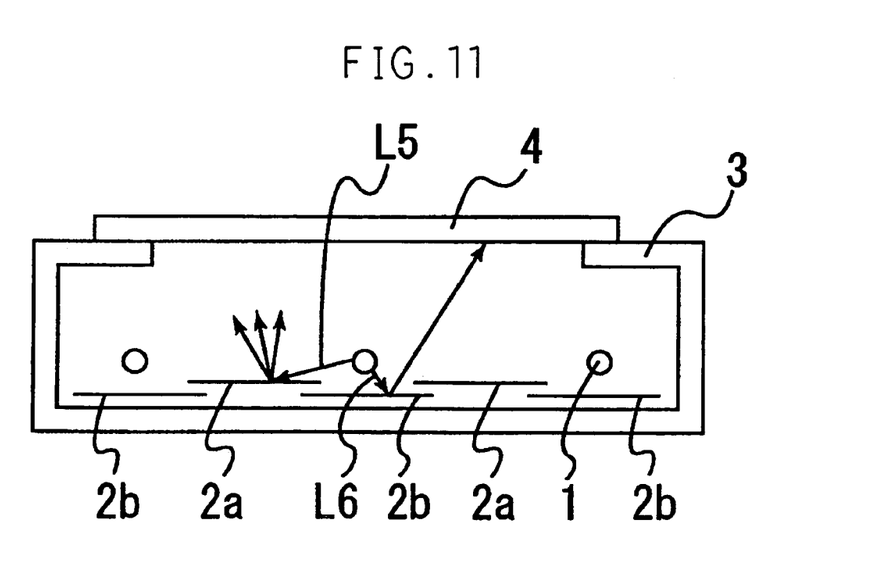
FIG. 11 is a sectional view showing one embodiment of the plane light source device according to the present invention.

FIG. 11 is a view of an optical path for explaining an action of the scatter reflection plate 2a and the regular reflection plate 2b shown in FIG. 10.

Light L6 emitted from the line light sources 1 is incoming on the regular reflection plate 2b arranged in the vicinity thereof and reflected at an angle equal to the incident angle to be impinged on the scattering plate 4. On the other hand, the light L5 incoming on the scatter reflection plate 2a is irregularly reflected in the vicinity of the incoming position to thereby irradiate the scattering plate 4. As explained in the embodiment 1, the incident angle of the light impinged on the scatter reflection plate 2a becomes approximately parallel at the position more apart from the line light sources 1.

In the plane light source device in the embodiment 3, the line light sources 1 are respectively arranged on the regular reflection plates 2b at a predetermined space and the scatter reflection plates 2a are alternately arranged so as to be adjacent to the regular reflection plates 2b. Therefore, light incoming from the line light sources 1 with an approximately parallel angle is irregularly reflected in the vicinity of the incoming position, thereby being capable of enhancing the efficiency of use of light, and hence, uniform illumination light can be obtained.

Figure 13:
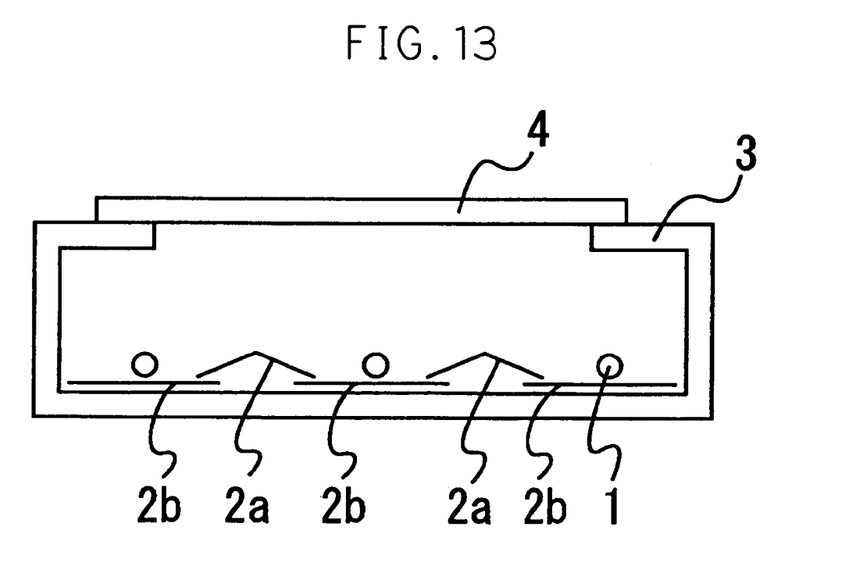
FIG. 13 is a sectional view showing one embodiment of the plane light source device according to the present invention.

As shown in FIG. 13, an inclined face may be provided on the scatter reflection plate 2a as a modified example of the embodiment 3. This modified example allows to increase an amount of light incoming on the scatter reflection plate 2a, thereby enhancing the scattering effect by the scatter reflection plate 2a. As a result, more uniform illumination light can be obtained.

The angle of the inclined face can be changed depending upon the type of the light source to be used or desired brightness distribution. Further, although the inclined face is provided at the scatter reflection plate in this embodiment, any shape such as a projection or round shape may be applied only for effectively impinging light from the light source on the scatter reflection plate 2a.

Figure 12:
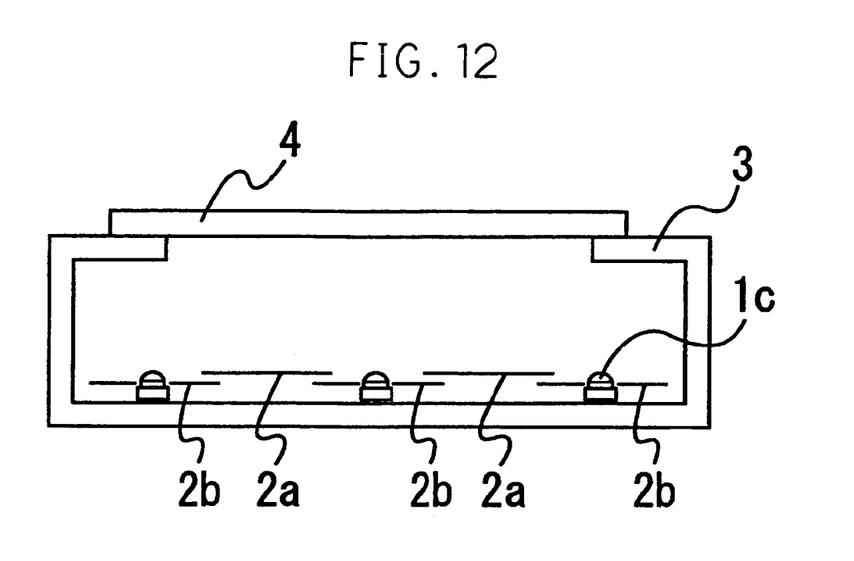
FIG. 12 is a sectional view showing one embodiment of the plane light source device according to the present invention.

The same effect can be obtained even by using the point light source 1c explained in the embodiment 1 as shown in FIG. 12, other than the line light source 1.

It should be noted that, instead of the reflector 5 used in the embodiments 1 and 2, a reflection material or white paint may be applied at the inside of the housing 3. This enables to reduce loss of light emitted from the light source.

Figure 14:
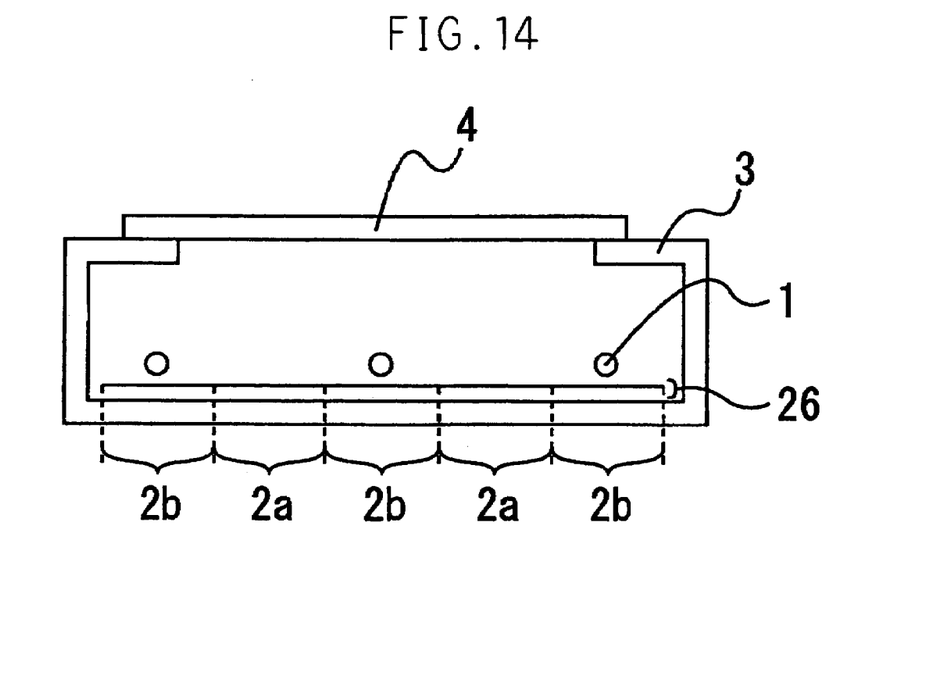
FIG. 14 is a sectional view showing one embodiment of the plane light source device according to the present invention.

It should be noted that, as shown in FIG. 14, the reflection plate 26 may be composed of a single plate-like optical member having a regular reflection section 2b that regularly reflects incoming light and a scatter reflection section 2a that irregularly reflects incoming light, this single plate-like optical member being arranged on the bottom surface 3b of the housing 3. Moreover, the regular reflection plate may be arranged all over the bottom surface 3b of the housing 3 and a scattering sheet may be provided on a part of the surface of the regular reflection plate, to thereby form the regular reflection section and the scatter reflection section. This construction decreases the number of components, thereby being capable of reducing a problem such as positional displacement of the reflection plate.

Embodiment 4

The construction shown in the embodiments 1 to 3 wherein the scatter reflection plate and regular reflection plate are alternately linearly arranged causes a rapid change in the brightness at the boundary section, that is apt to cause non-uniformness in illumination light. As a method for not attracting attention to the non-uniformness in the illumination light due to the difference in the reflection property, a reflection property adjusting section for changing stepwise a scatter reflectance (a ratio of light that is scattered and reflected to regularly reflected light) may be provided between the scatter reflection plate and the regular reflection plate.

Figure 15:
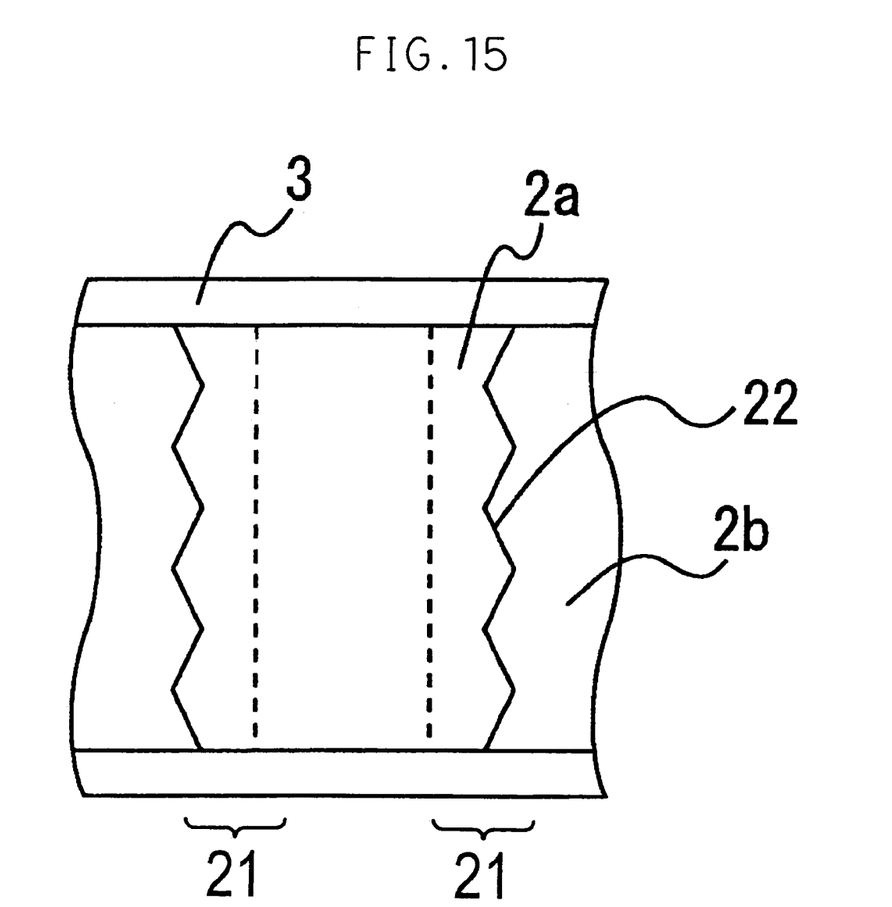
FIG. 15 is a partial plan view showing one embodiment of the plane light source device according to the present invention.

FIG. 15 is a partial plan view showing another embodiment of the plane light source device according to the present invention. The plane light source device in this embodiment has an area 21 where the boundary 22 between the scatter reflection plate 2a and the regular reflection plate 2b is formed into a waveform. This area 21 functions as a reflection property adjusting section. Specifically, providing the area 21 reduces stepwise the scatter reflectance of light directing from the scatter reflection plate 2a toward the regular reflection plate 2b, with the result that the non-uniform brightness caused by the difference in the reflection property between the scatter reflection plate 2a and the regular reflection plate 2b is not so noticeable, thereby being capable of obtaining a smooth brightness distribution. Although the boundary 22 between the scatter reflection plate 2a and the regular reflection plate 2b is formed into a linear waveform, it should be noted that it may be formed into a curved line. Moreover, it may be formed into a continuous rectangular or convex/concave shape. The other constructions are the same as those in the embodiments 1 to 3.

Figure 16:
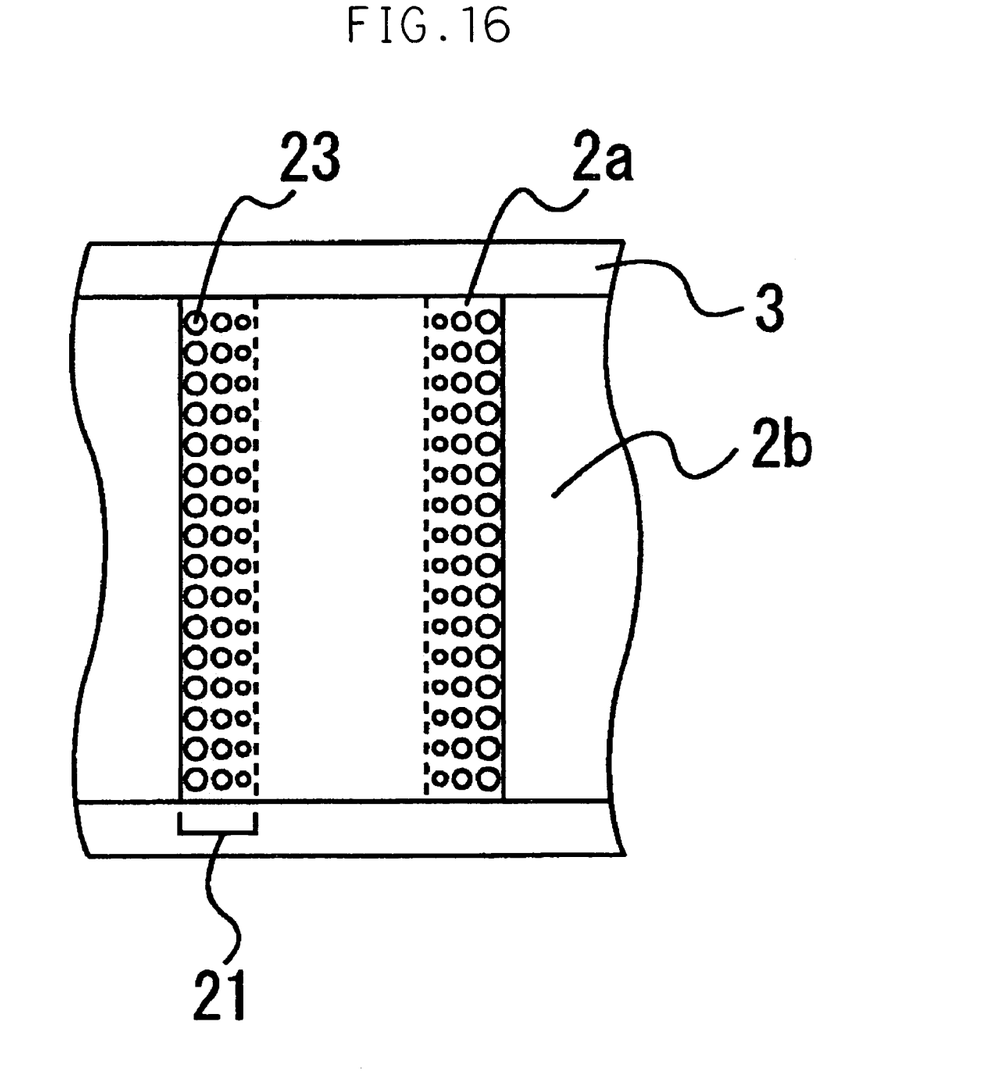
FIG. 16 is a partial plan view showing one embodiment of the plane light source device according to the present invention.

Further, in case where the scatter reflection plate 2a is arranged on the regular reflection plate 2b, the reflection property adjusting section 21 may be composed by continuously providing circular holes 23, whose diameter increases toward the regular reflection plate 2b, at the overlapping section of the scatter reflection plate 2a and the regular reflection plate 2b as shown in FIG. 16. According to this modified example, the scatter reflectance of light is reduced stepwise toward the regular reflection plate 2b, so that the non-uniformness of the illumination light, that is caused by the difference in the reflection property between the scatter reflection plate 2a and the regular reflection plate 2b, is made unnoticeable, thereby being capable of obtaining illumination light, having a smooth distribution, at the scattering plate 4.

Figure 17:
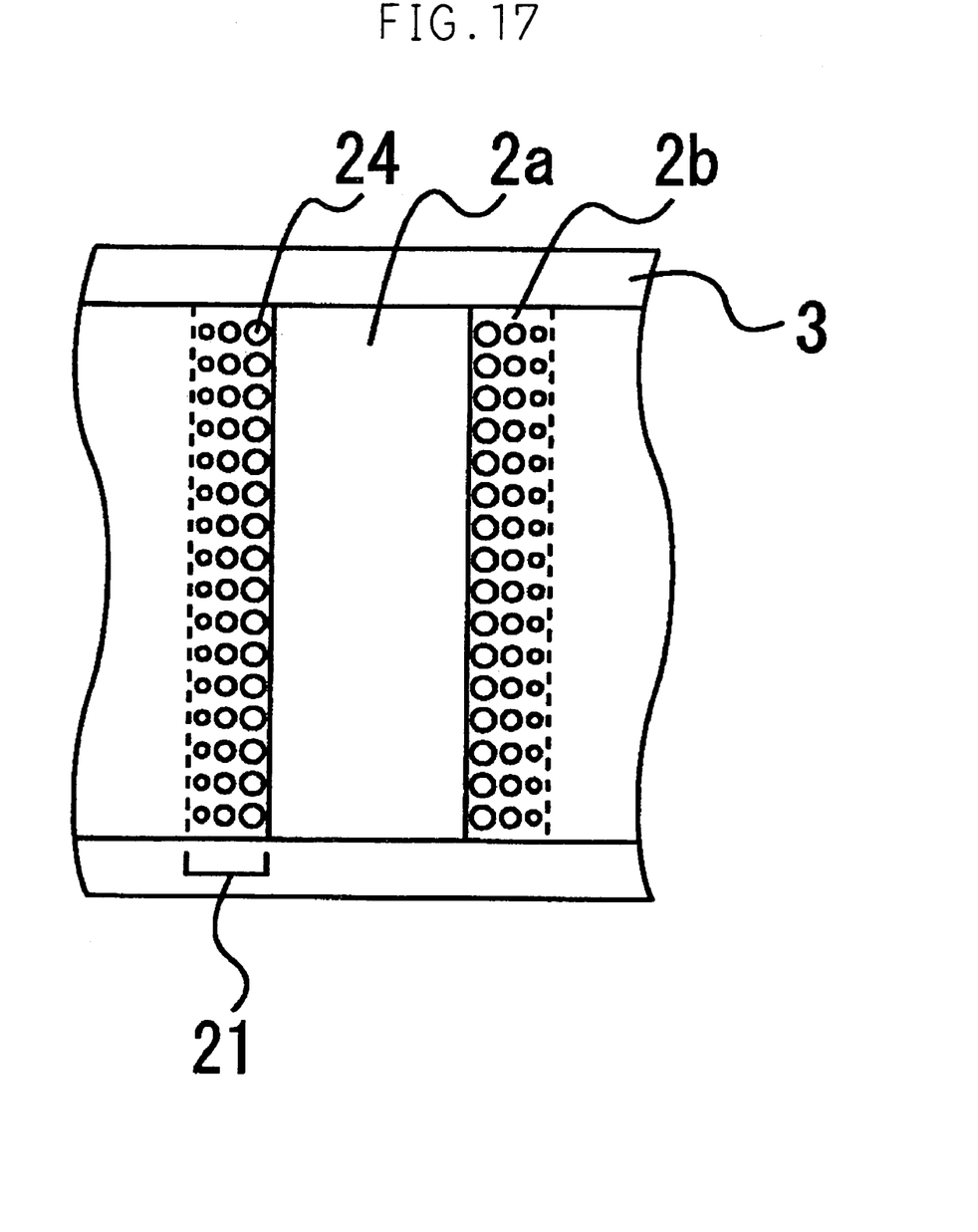
FIG. 17 is a partial plan view showing one embodiment of the plane light source device according to the present invention.

Moreover, in case where the regular reflection plates 2b are arranged on the scatter reflection plate 2a as shown in FIG. 17, circular holes 24 whose diameter decreases toward the regular reflection plate 2b may be provided at the overlapping section of the regular reflection plate 2b and the scatter reflection plate 2a.

Further, holes provided at the overlapping section are formed such that the holes having the same diameter are provided so as to reduce its density in order to reduce stepwise the scatter reflectance of light toward the regular reflection plate 2b.

Figure 18:
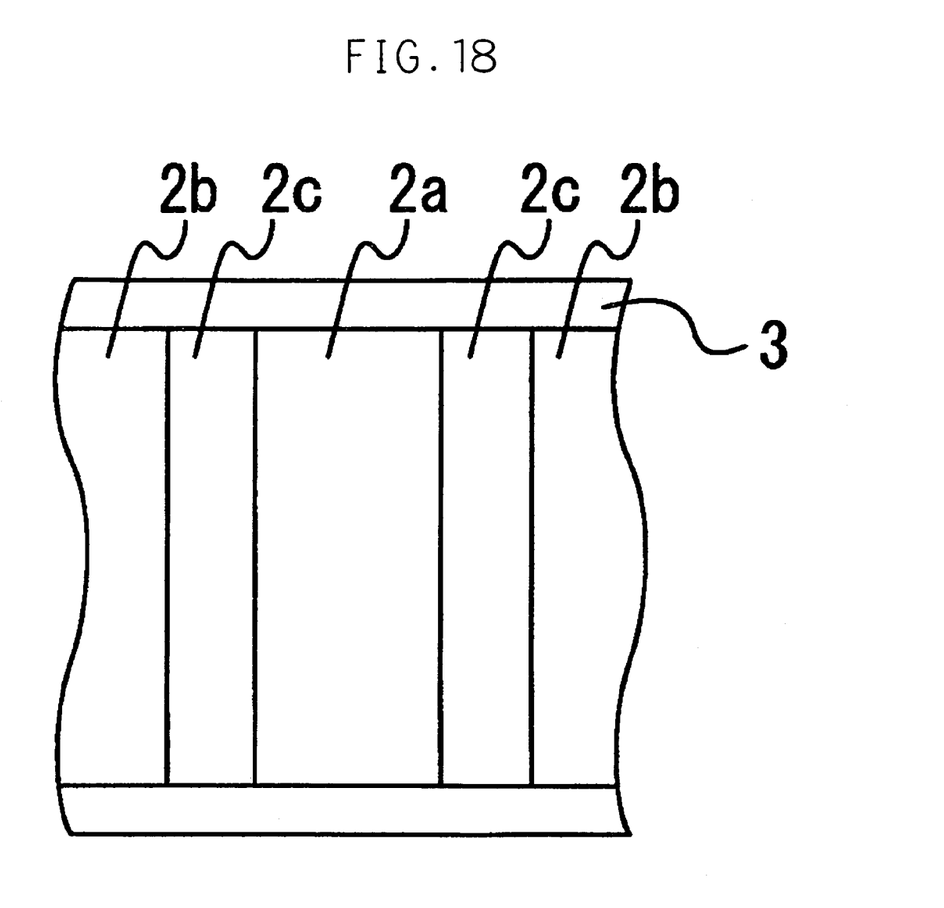
FIG. 18 is a partial plan view showing one embodiment of the plane light source device according to the present invention.

Moreover, as shown in FIG. 18, an optical member 2c having a scatter reflectance that is intermediate between the scatter reflectance of the scatter reflection member 2a and that of the regular reflection member 2b may be provided between the scatter reflection plate 2a and the regular reflection plate 2b.

The plane light source device of the present invention has a regular reflection section that regularly reflects incoming light and a scatter reflection section that irregularly reflects incoming light, those of which being suitably arranged, resulting in that an efficiency of use of light is enhanced and a desired brightness distribution can be obtained according to a characteristic of a display device.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A plane light source device used for transmissive-type liquid crystal display panel, said plane light source device comprising a housing having an opening section, a scattering plate arranged at said opening section for scattering incoming light onto said liquid crystal display panel, and a light source arranged in said housing, said plane light source device further comprising:

a regular reflection section which regularly reflects incoming light from said light source and a scatter reflection section which irregularly reflects said incoming light, wherein both said regular reflection section and scatter reflection section are provided at a bottom surface of said housing opposite to said scattering plate, wherein said scatter reflection section and said regular reflection section are arranged so as to have an overlapping section where both sections are partially overlapped with each other, further wherein a refracting device for refracting light emitted from said light source toward said regular reflection section and said scatter reflection section is provided at the position where light from said light source is emitted.

2. The plane light source device of claim 1, wherein a reflection property adjusting section that reduces stepwise the scatter reflectance toward said regular reflection section is provided between said regular reflection section and said scatter reflection section.

3. A display system comprising of a display unit and the plane light source device of claim 1, wherein said display unit comprising a display device for modulating light incoming from said plane light source device.

4. A display system comprising of a display unit and the plane light source device of claim 2, wherein said display unit comprising a display device for modulating light incoming from said plane light source device.

5. The plane light source device of claim 1, wherein said regular reflection section and said scatter reflection section are respectively composed of a regular reflection plate that regularly reflects incoming light and a scatter reflection plate that irregularly reflects said incoming light.

6. The plane light source device of claim 1, wherein said regular reflection section and said scatter reflection section provided at said bottom surface of said housing are respectively composed of a regular reflection plate formed all over the bottom surface of said housing and a scattering sheet arranged in intimate contact with a part of said regular reflection plate at the side of said opening section.

7. The plane light source device of claim 1, wherein said boundary between said regular reflection section and said scatter reflection section is formed into a waveform.

8. The plane light source device of claim 1, wherein a reflection section having a scatter reflectance lower than that of said scatter reflection section is provided between said regular reflection section and said scatter reflection section.

9. The plane light source device of claim 1, wherein an inclined face is provided at said scatter reflection section.

10. The plane light source device of claim 2, wherein said regular reflection section and said scatter reflection section are respectively composed of a regular reflection plate that regularly reflects incoming light and a scatter reflection plate that irregularly reflects said incoming light.

11. The plane light source device of claim 2, wherein said regular reflection section and said scatter reflection section provided at said bottom surface of said housing are respectively composed of a regular reflection plate formed all over the bottom surface of said housing and a scattering sheet arranged in intimate contact with a part of said regular reflection plate at the side of said opening section.

12. The plane light source device of claim 2, wherein said boundary between said regular reflection section and said scatter reflection section is formed into a waveform.

13. The plane light source device of claim 2, wherein a reflection section having a scatter reflectance lower than that of said scatter reflection section is provided between said regular reflection section and said scatter reflection section.

14. The plane light source device of claim 2, wherein an inclined face is provided at said scatter reflection section.

15. A plane light source device comprising a housing having an opening section, a scattering plate arranged at said opening section for scattering incoming light, and a light source arranged in said housing, said plane light source device further comprising:

a regular reflection section which regularly reflects incoming light from said light source and a scatter reflection section which irregularly reflects said incoming light, wherein both said regular reflection section and scatter reflection section are provided at a bottom surface of said housing opposite to said scattering plate, wherein a refracting device having a trapezoidal sectional shape for refracting light emitted from said light source toward said regular reflection section and said scatter reflection section is provided at the position where light from said light source is emitted, wherein said regular reflection section and said scatter reflection section are respectively composed of a regular reflection plate that regularly reflects incoming light and a scatter reflection plate that irregularly reflects said incoming light, wherein said scatter reflection plate and said regular reflection plate are arranged so as to have an overlapping section where both plates are overlapped with each other, wherein in case where said scatter reflection plate is arranged on said regular reflection plate, holes whose diameter increases toward said boundary between said scatter reflection plate and said regular reflection plate are provided at said overlapping section of said scatter reflection plate, and in case where said regular reflection plate is arranged on said scatter reflection plate, holes whose diameter decreases toward said boundary between said scatter reflection plate and said regular reflection plate are provided at said overlapping section of said regular reflection plate.

16. A plane light source device used for a transmissive-type liquid crystal display panel, said plane light source device comprising a housing having an opening section, a scattering plate arranged at said opening section for scattering incoming light onto said liquid crystal display panel, and a light source arranged in said housing, said plane light source device further comprising:

a regular reflection section which regularly reflects incoming light from said light source and a scatter reflection section which irregularly reflects said incoming light, wherein both said regular reflection section and scatter reflection section are provided at a bottom surface of said housing opposite to said scattering plate, wherein said scatter reflection section and said regular reflection section are arranged so as to have an overlapping section where both sections are partially overlapped with each other.

17. A plane light source device used for transmissive-type liquid crystal display panel, said plane light source device comprising a housing having an opening section, a scattering plate arranged at said opening section for scattering incoming light onto said liquid crystal display panel, and a light source arranged in said housing, said plane light source device further comprising:

a regular reflection section which regularly reflects incoming light from said light source and a scatter reflection section which irregularly reflects said incoming light, wherein both said regular reflection section and scatter reflection section are provided at a bottom surface of said housing opposite to said scattering plate, wherein a refracting device for refracting light emitted from said light source toward said regular reflection section and said scatter reflection section is provided at the position where light from said light source is emitted, wherein said regular reflection section and said scatter reflection section are respectively composed of a regular reflection plate that regularly reflects incoming light and a scatter reflection plate that irregularly reflects said incoming light, further wherein said scatter reflection plate and said regular reflection plate are arranged so as to have an overlapping section where both plates are overlapped with each other, wherein in case where said scatter reflection plate is arranged on said regular reflection plate, holes whose diameter increases toward said boundary between said scatter reflection plate and said regular reflection plate are provided at said overlapping section of said scatter reflection plate, and in case where said regular reflection plate is arranged on said scatter reflection plate, holes whose diameter decreases toward said boundary between said scatter reflection plate and said regular reflection plate are provided at said overlapping section of said regular reflection plate.

* * * * *